United States Patent [19]

Phillips

[11] 4,230,071
[45] Oct. 28, 1980

[54] ADJUSTABLE EGG CARRIER SYSTEM

[76] Inventor: Roy L. Phillips, Rte. 3, Adairsville, Ga. 30103

[21] Appl. No.: 1,875

[22] Filed: Jan. 8, 1979

[51] Int. Cl.³ ............................................. A01K 31/00
[52] U.S. Cl. ....................................................... 119/21
[58] Field of Search ....................... 119/21, 22, 43, 48; 198/678, 685; 104/122

[56] References Cited

U.S. PATENT DOCUMENTS

| Re. 25,714 | 1/1965 | Kaegebein | 119/21 |
|---|---|---|---|
| 1,340,962 | 5/1920 | Lane | 104/122 |
| 1,452,746 | 4/1923 | Lyding | 119/21 |
| 2,161,388 | 6/1939 | Rosenthal | 198/685 |
| 2,628,691 | 2/1953 | Barrett | 198/678 |
| 3,132,735 | 5/1964 | Nilsen | 119/43 |

*Primary Examiner*—Hugh R. Chamblee
*Attorney, Agent, or Firm*—Jones, Thomas & Askew

[57] ABSTRACT

Two elongated chicken houses are placed in parallel, side-by-side relationship with an egg room there between. A pair of U-shaped overhead conveyor rails extend through the eggroom and chicken houses, with each conveyor rail having one leg extending along the length of one end of a chicken house, its middle lateral leg extending through the eggroom, and its other end leg extending along the length of the one end of the other chicken house. An adjustable egg carrier is mounted on and is movable along each conveyor rail, and includes a vertically adjustable framework with an egg support platform swingably supported beneath the conveyor rail. A cable and winch are used to raise and lower the egg support platform, to lower the platform to a convenient working level while in the chicken houses and to raise the platform so that it clears the platforms at the sides of the chicken houses when being moved through the elevated side doors of the chicken houses to the eggroom.

8 Claims, 5 Drawing Figures

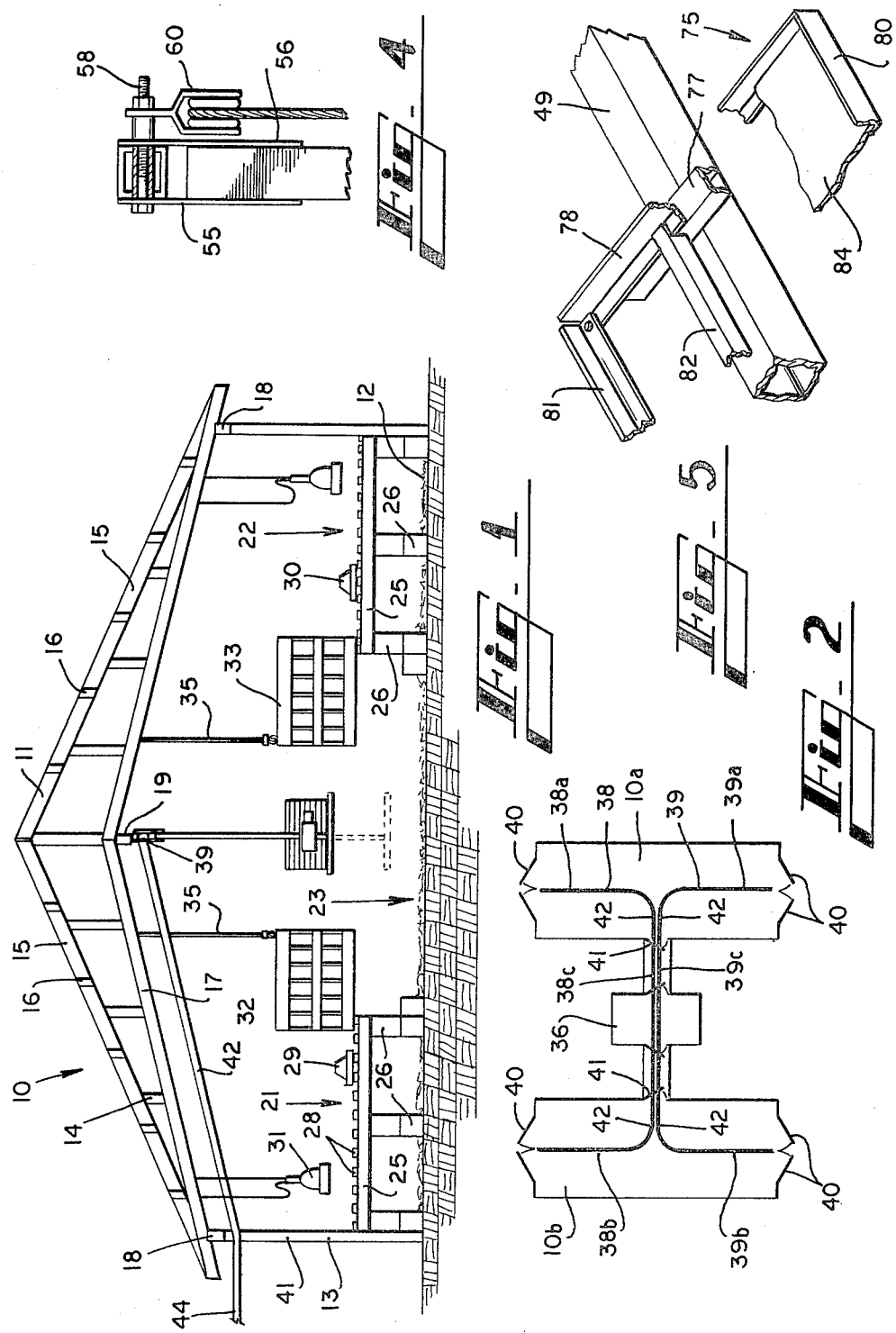

ADJUSTABLE EGG CARRIER SYSTEM

TECHNICAL FIELD

The invention disclosed herein relates to an adjustable egg carrier system for chicken houses wherein eggs are gathered and taken to an egg room where they are maintained at a constant temperature. The carrier system includes an overhead conveyor rail which movably supports an egg carrier.

BACKGROUND OF THE INVENTION

Poultry such as chickens that produce eggs for human consumption are frequently maintained in chicken houses where a large number of the chickens are feed controlled diets in a controlled atmosphere so as to maximize egg production and the health of the poultry. One of the perferred structural arrangements for chicken houses is to provide an enlongated house having raised platforms extending along each side of the house and a center isle at ground level between the platforms. The surfaces of the platforms are formed from spaced slats, and water and food are provided to the chickens on the platforms. Thus, the chickens feed on the platforms and the droppings from the chickens tend to fall through the spaced slats to the ground below the platform. In the center isle between the raised platforms a layer of wood shavings is usually spread on the ground, and the chickens use this space for breeding. The nests where the chickens are inclined to lay their eggs rest with one end supported by the platforms and the other end supported by cables from the roof truss of the chicken house, so that the nests extend out away from the raised platforms and over the center aisle.

Chickens are usually placed in the chicken houses after they are ten to twelve weeks old, and after the chickens are approximately 25 weeks old they usually begin laying eggs. After the chickens have been in the chicken houses from 36 to 42 weeks, their egg production begins to decrease, and the chickens are then removed from the chicken house and slaughtered for sale as baking hens, etc. Before a new flock of chickens is received in the chicken houses the slatted platforms, nests, feeders and other elements are removed from the chicken houses so as to clean out the litter and old shavings, the elements of the chicken house are cleaned, and after the elements have been cleaned they are replaced in the chicken house. It is desirable to be able to move trucks and other tall vehicles into a chicken house, along the center aisle of the chicken house, in order to load and unload the nests, platforms, etc., and to remove the litter and to supply the new shavings, etc. Thus, it is necessary that the truss system for the roof structure be high at the center of the chicken house to accommodate the vehicles and equipment. The chicken houses are therefore constructed not only to enhance egg production, but to expedite the cleaning of the houses between flocks of chickens.

When chickens are present in a chicken house and eggs are to be gathered, it is customary to stack the eggs in egg trays that are shaped to receive individual eggs, and to hand carry the trays or place the trays on rolling carts to carry the trays from one end to the other end of the chicken house and then to an egg room where the eggs are temporarily stored for later pickup and delivery by an egg distributor. Because of the large number of chickens present in a typical chicken house and therefore the large number of eggs to be gathered therein, the gathering of eggs is a tedious and awkward process.

SUMMARY OF THE INVENTION

Briefly described, the present invention comprises an adjustable egg carrier system for chicken houses which comprises an overhead conveyor rail that extends along the length of a portion of a chicken house, and then through an egg room, and then into and along a portion of the length of an adjacent chicken house, and an adjustable egg carrier mounted on and movable along the rail. The egg carrier is adjustable in height so that it can be lowered to a desired working level when the egg carrier is located in the center aisle of a chicken house between the raised platforms, where the worker can gather eggs from the nests and place the eggs and egg trays on the carrier. When the carrier is full, the carrier is raised to a height where it can pass over the raised slatted platforms at the sides of the chicken house, and the egg carrier is then moved along its rail from the chicken house, out through the side of the chicken house and into the egg room, where the eggs are removed from the egg carrier and cleaned, stored, etc.

The adjustable egg carrier comprises a framework that includes an upper support bar having trolleys mounted thereon at its ends for suspension from the overhead conveyor rail, a lower support bar and egg support platform mounted thereon, and telescoping end bars extending between the upper support bar and the lower support bar which permit vertical movement of the egg support platform with respect to the upper support bar. The egg support platform is swingably supported from the upper support bar so that the egg carrier is flexible and not inclined to bind or jam as the egg support platform is raised or lowered.

Thus, it is the object of this invention to provide an adjustable egg carrier system for use in poultry houses, such as chicken houses, wherein the eggs of the poultry can be expediently gathered and transported to an egg room.

Another object of this invention is to provide an adjustable egg carrier for poultry houses which can be raised and lowered between desired working levels and desired transport levels, substantially without hazard of binding or jamming.

Other objects, features an advantages of the present invention will become apparent upon reading the following specification, when taking in conjunction with the accompanying drawings.

BRIEF DESCRIPTION OF THE DRAWINGS

FIG. 1 is a schematic side cross sectional view of a chicken house.

FIG. 2 is a schematic plan view of a pair of chicken houses, and egg room and the conveyor rails extending through the chicken houses and egg room.

FIG. 4 is a detail of one of the joints between the telescoping side bars and the upper support bar of the egg carrier of FIG. 3 taken along lines 4—4 of FIG. 3.

FIG. 5 is a detailed perspective view, with parts shown in cross section and parts removed for clarity, of a portion of the egg support platform.

DETAILED DESCRIPTION

Figure 3:
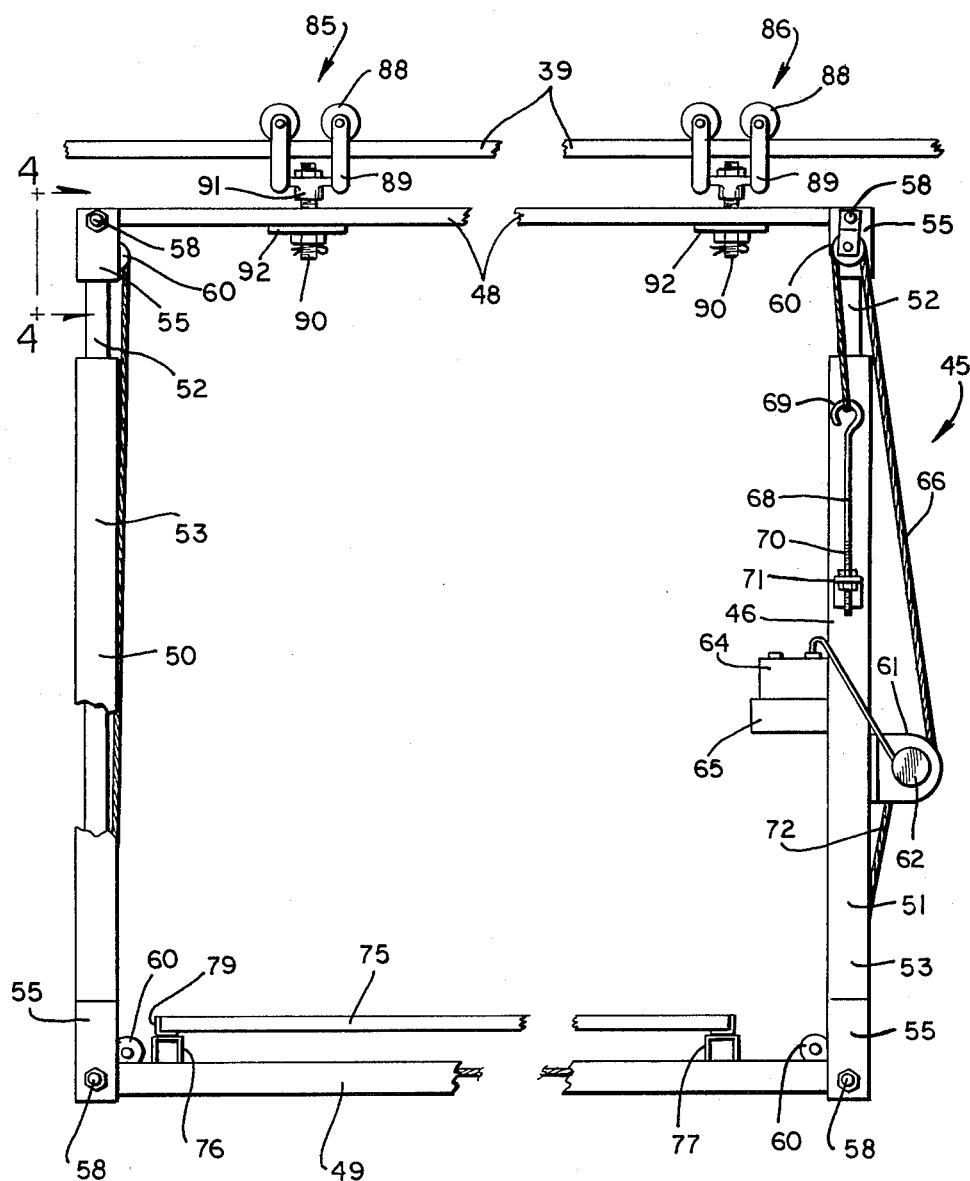
FIG. 3 is a side elevational view, with parts broken away, of an egg carrier.

Referring now in more detail to the drawings, in which like numerals indicate like parts throughout the several views, FIG. 1 illustrates chicken house 10 which includes a roof structure 11 supported over the ground surface 12 by vertical side supports 13. The roof structure includes a truss system 14 having rafters 15, purlins 16 and braces 17. The braces 17 are inclined from their side support plates 18 up to their center beam 19.

The chicken house 10 is an elongated structure which includes slatted platforms 21 and 22 extending along its sides, with the area between the platform 23 comprising a center aisle. The slatted platforms 21 and 22 comprise a plurality of spaced support beams 25 mounted on support elements 26, and a plurality of relatively narrow elongated slats 28 extending across the support beams 25 in spaced relation with respect to one another, so that spaces are formed between the slats 28. Feed trough assemblies 29 and 30 each extend along the length of the slatted platform 21 and 22, and a chain conveyor (not shown) in the feed trough assembly functions to carry feed in measured amounts throughout the trough at predetermined time intervals, so as to supply the chickens in the chicken house 10 with the proper food. A plurality of water supply pots 31 are hung from the truss 14 and water is automatically supplied to each of the water supply pots 31.

A plurality of nest houses are placed in the chicken house 10, with the nest houses in one row 32 of nest houses each having one end thereof resting on the raised platform 21 and the other end thereof supported by a cable 35. The other plurality of nest houses of row 33 are spaced across the aisle 23 and the houses in row 33 are each supported in a similar manner, by each having one end supported on the slat platform 22 and its other end supported by a cable 35. The nest houses are subdivided into a dozen compartments on each side so that the chickens are accommodated in each compartment as they lay eggs.

As illustrated in FIG. 2, two elongated chicken houses 10a and 10b are placed in side by side, parallel relationship with respect to each other, and an egg room 36 is positioned between the chicken houses. As schematically illustrated in FIG. 2, a pair of overhead conveyor rails 38 and 39 of U-shaped arrangement are placed in chicken houses 10a and 10b and egg room 36. The overhead conveyor rail 38 includes side legs 38a and 38b and connecting leg 38c, while conveyor rail 39 includes side legs 39a and 39b and connecting leg 39c.

As illustrated in FIG. 1, the overhead conveyor rail 39 is suspended from the truss 14 of the chicken house, and is extended along the center aisle 23 at the center beam 19 at a high elevation so as to clear any vehicles or equipment that are to pass through the center aisle 23.

Each chicken house 10a and 10b includes end doors 40 at each of its ends, and a side door 41 intermediate its ends. The conveyor rails 38 and 39 are each curved at the junction of their side legs with their intermediate leg, and the portions 42 of the conveyor rails which turn and extend toward the egg room 36 are inclined downwardly from the center beam 19 toward the lower opening of the side door 41. The rails then turn back to a horizontal attitude at 44 and extend at a horizontal attitude through egg room 36.

As illustrated in FIG. 3, the adjustable end carrier 45 comprises a framework 46 that includes an upper, horizontally extending support bar 48, lower horizontal support bar 49 and adjustable end bars 50 and 51. The adjustable end bars 50 and 51 each comprise an inner bar 52 and an outer tubular bar 53, with the inner bar 52 telescopically received within outer bar 53. Mounting braces 55 and 56 (FIG. 4) are rigidly connected to the opposite ends of the adjustable end bars 50, with braces being connected to the protruding end of the inner bar 52 and with braces being connected to the lower end of the outer tubular bar 53. A connecting pin 58 extends through the mounting braces 55 and 56 and through the upper and lower horizontal support bars 48 and 49, thus connecting the adjustable end bars 50 and 51 at their upper and lower ends to the support bars 48 and 49. The connecting pins 58 thus make a pivotal connection between the adjustable end bars 50 and 51 and the upper and lower support bars 48 and 49.

Pulleys 60 are supported by the connecting pins 58 at the junction of the adjustable end bars 50 and 51 with the upper and lower support bars 48 and 49.

A winch 61 is mounted on the outer tube of the bar 53 of adjustable end bars 51, and a motor 62 drives the reel of the winch. A twelve volt battery 64 is mounted in a support platform 65 which is hung on the outer tube of the bar 53 of adjustable end bars 51, and an electrical connection is made between the battery and the motor. A first, relatively short cable 66 extends from the reel of winch 61 in an upward direction about the pulley 60 at the intersection of adjustable end bars 51 with the upper support bar 48, and then downwardly to eye bolt 68. Eye bolt 68 includes an eye 69 to which the end of cable 66 is attached, and threaded shank 70 that extends through a bracket 71 welded to the surface of outer tubular bar 53 of adjustable end bar 51.

A relatively long cable 72 extends from the reel of winch 61 in a downward direction, first about pulley 60 at the intersection of adjustable end bars 51 with lower support bar 49, then about pulley 60 at the intersection of lower support bar 49 and adjustable end bars 50, then in an upward direction about the upper pulley 60 at the intersection of adjustable end bars 50 with upper support bar 48, and then to an eyebolt (not shown) mounted on outer tubular bar 53 of adjustable end bar 50. It will be noted that cable 66 is connected to eye bolt 68 on one side of the framework while cable 72 is connected to the eyebolt (not shown) on the other side of the framework.

Egg support platform 75 is rigidly mounted on lower support bar 49. Support brackets 76 and 77 are welded to lower support bar 49, L-shaped cross bar 78 and 79 are mounted on brackets 76 and 77, and L-shaped side rails 80 and 81 are mounted at their ends to cross bars 78 and 79. A center brace 82 extends from one support bracket 76 to the other support bracket 77 over lower support bar 49. A plywood sheet 84 is positioned in the confines of L-shaped cross bar 78 and 79 and side rails 80 and 81 to form a work surface of the egg support platform.

It will be noted that the egg support platform is rigidly connected to the lower support bar 49 of the framework but is not connected to the adjustable end bars 50 and 51, leaving the egg support platform and lower support bar free to swing with respect to the upper support bar 48 about the connecting pins 58 at the four corners of the framework.

Trolleys 85 and 86 are mounted on the upper support bar 48 and are arranged to engage a conveyor rail 38 or 39. Each trolley 85 and 86 includes a pair of trolley wheels 88 mounted in bracket 89, and a pivot pin 90 extends through a swivel 91 of the bracket 89. The pivot pin extends through the upper support bar 48. A support brace 92 reinforces the upper support bar at the pin 90. Thus, the trolleys 85 and 86 can carry the framework along a curved path of a conveyor rail 38 or 39.

Operation

When the egg carrier 45 is to be placed along the center aisle 23 of a chicken house 10, the electrical winch 61 is energized so as to pay out its cables 66 and 72, to lower the egg support platform 75 to a suitable elevation for gathering eggs. As the cable pays out from winch 61, the cable 66 passes about its upper pulley 60 and allows the outer tubular bar 53 to move down the length of the inner bar 52. In the meantime, the cable 72 extends about its pulley 60 and allows the outer tubular bar 53 of adjustable end bars 50 to move down the inner bar 52. Since the framework 46 is flexible in that the connecting pins 58 at the four corners of the framework permit the adjustable end bars 50 to expand or contract without regard to the other end bars, any friction between the inner and outer bars 52 and 53 of the adjustable end bars 50 and 51 will not affect the movement of the other adjustable end bars, so that no binding or jamming of the inner and outer bars 52 and 53 is likely to occur, and if any momentary frictional contact between the bars should occur, it is unlikely that the bars would become jammed. Moreover, the adjustable end carrier 45 is sometimes pushed along its overhead conveyor rail 38 or 39 as its winch 61 is being operated, so that the egg support platform 75 will swing with respect to the upper support bar 48. Thus, the egg support platform can be raised and lowered even when canted with respect to the upper support bar 48.

While this invention has been disclosed in context with chicken houses, it will be understood by those skilled in the art that the particular houses in which the invention is utilized can be other type poultry houses, such as turkey or guinea houses. Moreover, while a winch and cable system has been illustrated as the means for raising and lowering the egg support platform 75, it should be understood that other power means can be utilized, such as a hand cranked winch, pneumatic or hydraulic cylinders, rack and pinion arrangement, etc.

While this invention has been described in specific detail with particular reference to a preferred embodiment thereof, it will be understood that variations and modifications can be effected within the spirit and scope of the invention as described hereinbefore and as defined in the appended claims.

I claim:

1. Apparatus for processing eggs in a chicken house including an elongated roof structure, support means positioned about the edges of said roof and supporting said roof over the ground, a raised platform extending along each side of said house, each said raised platform including a slat floor surface for supporting chickens above the ground surface whereby litter from the chickens can fall through the slats to the ground, a plurality of nest houses in said chicken house, each nest house having one edge portion thereof supported by one of said raised platforms and extending out over the ground between the raised platforms, the improvement therein comprising a door opening in one side portion of said chicken house, an overhead conveyor system including a rail extending along the length of the chicken house between the raised platforms and turned to extend through said side door opening, an adjustable egg carrier mounted on and movable along said rail, said adjustable egg carrier including a framework with an upper cross bar, a lower cross bar, vertically extending end bars in telescoped relationship pivotably connected at their upper and lower ends to the ends of said upper and lower cross bars, trolleys mounted on said framework and in engagement with said rail, said lower cross bar including an egg support platform and means for retracting and extending said end bars for raising and lowering said egg support platform on said framework, whereby said platform is raised on said framework as the adjustable egg carrier is moved through the side door opening and over the raised platform and said egg support platform is lowered when the adjustable egg carrier is located between the raised platforms for gathering eggs from the nest houses.

2. The apparatus of claim 1 and wherein said means for extending and retracting said end bars comprises a winch mounted on one pair of said end bars, a first cable extending from said winch in an upward direction and connected to one end portion of said upper cross bar, a second cable extending from said winch, first in a downward direction and then laterally beneath said egg support platform and then upwardly along the other pair of end support bars and connected to the other end portion of the upper cross bar.

3. The apparatus of claim 1 and wherein the portion of said rail extending along the length of the chicken house is located at a first elevation closely adjacent the roof structure and the portion of said rail extending through the side door opening of the chicken house is at a lower elevation than said first elevation.

4. An adjustable egg carrier for use on an overhead conveyor rail in a chicken house comprising a framework including an upper cross bar, a lower cross bar below said upper cross bar, a pair of telescoping end bars pivotably connected at their ends to the ends of said upper and lower cross bars, a trolley mounted on each end portion of said upper cross bar for supporting said egg carrier from an overhead conveyor rail, an egg support platform mounted on said lower cross bar, and means for progressively raising and lowering said lower cross bar and said egg support platform with respect to said upper crossbar.

5. The adjustable egg carrier of claim 4 wherein each pair of telescoping end bars comprises an outer tubular bar pivotally connected at one of its ends to said lower cross bar and an inner bar telescopically received in said outer bar and pivotally connected at one of its ends to said upper cross bar, and wherein said means for raising and lowering said lower cross bar and said egg support platform comprises pulleys mounted at the junctions of said upper cross bar with each of the inner bars of the telescoping end bars and at the junctions of said lower cross bar with each of the outer tubular bars of the telescoping end bars, a winch mounted on said framework, a cable extending from said winch about said pulleys, whereby when the cable is reeled on to the winch said lower cross bar and said egg support platform are raised with respect to said upper cross bar, and when the cable is reeled out from the winch said lower cross bar and said egg support platform are lowered with respect to said upper cross bar.

6. The adjustable egg carrier of claim 5 and wherein said winch is mounted on one of said outer tubular bars.

7. Apparatus for processing eggs in a chicken house wherein two elongated chicken houses are placed in parallel side-by-side arrangement with an egg room positioned between the chicken houses, a U-shaped overhead conveyor rail having one of its leg portions extending from an end portion of one of said chicken houses along the length inside the chicken house, then said rail being turned laterally with respect to the chicken house and having its middle leg extending into and through the egg room, and then said rail extending from said egg room into said other chicken house and turned to have its other leg thereof extend longitudinally along the other chicken house toward an end of the other chicken house, an adjustable egg carrier movably mounted on said conveyor rail, said adjustable egg carrier comprising a framework with an upper support bar, telescoping end bars pivotably suspended from the ends of said upper support bar, an egg support platform pivotably mounted to the lower end portions of said telescoping end bars and swingably suspended below said upper support bar, and means for retracting and extending said telescoping end bars for raising and lowering said egg support platform with respect to said upper support bar.

8. The apparatus of claim 7 and wherein two of said U-shaped overhead conveyor rails extend through said chicken houses and said egg room, with one of said rails having the legs of its U-shape extending through one end portion of each of said chicken houses and with the other of said rails having the legs of its U-shape extending through the other end portions of each of said chicken houses.

* * * * *